May 23, 1961 O. B. HARMES 2,985,746
BUTT-WELDING APPARATUS
Filed Feb. 12, 1959 2 Sheets-Sheet 1

INVENTOR
OREN B. HARMES
BY Williamson, Schroeder & Palmatier
ATTORNEYS

May 23, 1961

O. B. HARMES 2,985,746

BUTT-WELDING APPARATUS

Filed Feb. 12, 1959

INVENTOR
OREN B. HARMES
BY
Williamson, Schroeder & Palmatier
ATTORNEYS

United States Patent Office 2,985,746
Patented May 23, 1961

2,985,746
BUTT-WELDING APPARATUS
Oren B. Harmes, Algona, Iowa, assignor of one-half to Ladish Co., Tri-Clover Division, Kenosha, Wis., a corporation of Wisconsin
Filed Feb. 12, 1959, Ser. No. 792,755
14 Claims. (Cl. 219—125)

This invention relates to butt-welders. More particularly it relates to devices for butt-welding two pieces of work which are round in cross-section and may or may not be in fixed relation to their surroundings.

In butt-welding as heretofore known non-portable massive equipment has been required and such equipment has been used only after the two pieces of work have been tacked together at various points. It has been conventional for the welder to first secure the two pieces of work together by inserting an expansion plug within the pieces of work at the welding line and then tacking them together at spaced points. The expansion plug is then removed and a backup gas plug is inserted at the weld line, after which the actual welding operation has been performed. This procedure has been time consuming and hence costly. In performing the welding operation, it has been conventional to turn the two affixed pieces of work relative to the welding torch in order to accomplish the welding operation but this obviously limits the operation. My invention is directed towards eliminating most of the disadvantages of previously known equipment and welding procedures, in butt-welding two pieces of work substantially round in cross-section.

It is a general object of my invention to provide novel and improved apparatus and precedures for butt-welding two pieces of work substantially round in cross-section, the apparatus being simple, compact and portable.

A more specific object is to provide novel and improved apparatus and procedure for butt-welding two pieces of work which is so constructed and designed as to enable the butt-welding operation to be accomplished whether the pieces of work are movable or fixed and which will effect a substantial saving in time and labor in accomplishing the welding operation.

Another object is to provide a novel and improved butt-welding apparatus which enables substantially the entire butt-welding operation to be accomplished in a single continuous operation.

Another object is to provide novel and improved butt-welding apparatus which is sufficiently compact to permit welding joints which will be close together and to weld close to walls and obstructions.

Another object is to provide novel and improved butt-welding apparatus which enables the welder to readily control the amperage to be utilized in the welding operation without leaving the situs of the welding operation and to readily control the weld shielding and backup gas to be utilized.

Another object is to provide novel and improved butt-welding apparatus which will provide a weld of the highest quality at a minimum of expense and inconvenience.

Another object is to provide novel and improved butt-welding apparatus constructed and designed to cause the welding torch to progress along the weld line at a uniform speed and without requiring reduction gearing.

Another object is to provide novel and improved butt-welding apparatus which will permit welding a piece of work immediately adjacent an elbow in the piece of work without cocking the elbow at an angle.

Another object is to provide novel and improved butt-welding apparatus having means for positioning the welding torch axially of the pieces of work being welded and also having means for positioning the torch at an optimum spacing from the piece of work and maintaining the torch in that relation.

These and other objects and advantages of the invention will more fully appear from the following description made in connection with the accompanying drawings, wherein like reference characters refer to the same or similar parts throughout the several views, and in which.

Figure 1:
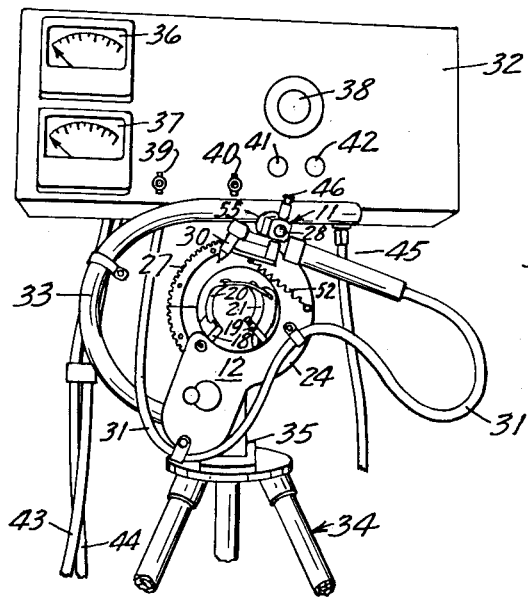
Fig. 1 is a front perspective view of my butt-welding apparatus.

My invention consists generally of a work engaging member (a clamp is shown) and a welding torch holding member associated with the engagement member in such a manner that the torch holding member can move around the piece of work to which the engagement member is secured. The invention includes a way on one of these members and a carriage means cooperating with the way on the other member so that the carriage means may move along the way to cause the torch holding member to move around the piece of work to which the engagement member is secured. The invention also includes drive means extending between the engagement member and the torch holding member so as to cause the carriage means to move relative to the way and thus progress the torch holding member around the work.

The preferred form of my invention as shown in Figs. 1-8, includes the engagement member or clamp indicated generally by the numeral 10 and the torch holding member indicated generally by the numeral 11, the latter being mounted on the former. The carriage means is indicated generally by the numeral 12 and the way is indicated generally by the numeral 13. The drive means is indicated generally by the numeral 14.

Figure 2:
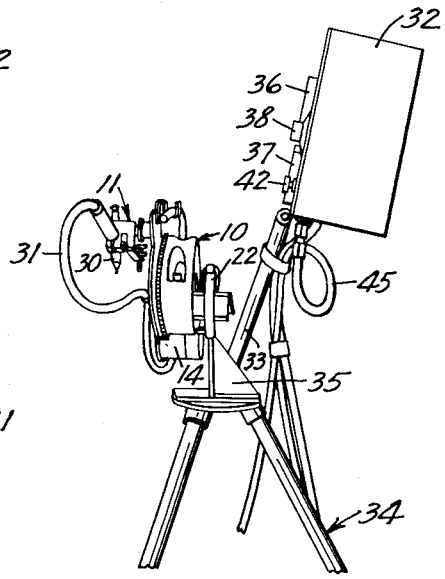
Fig. 2 is a perspective view taken from the side of my butt-welding apparatus.
Figure 5:
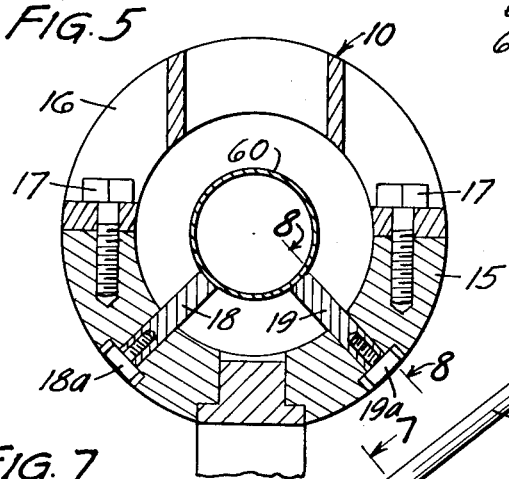
Fig. 5 is a vertical sectional view taken along line 5—5 of Fig. 3.
Figure 8:
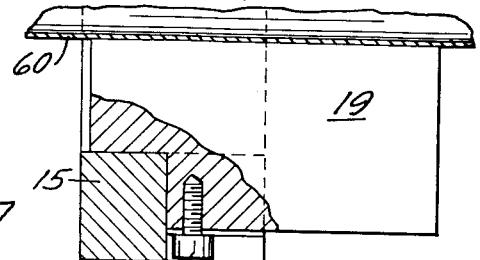
Fig. 8 is a view taken approximately along line 8—8 of Fig. 5 with portions broken away.
Figure 3:
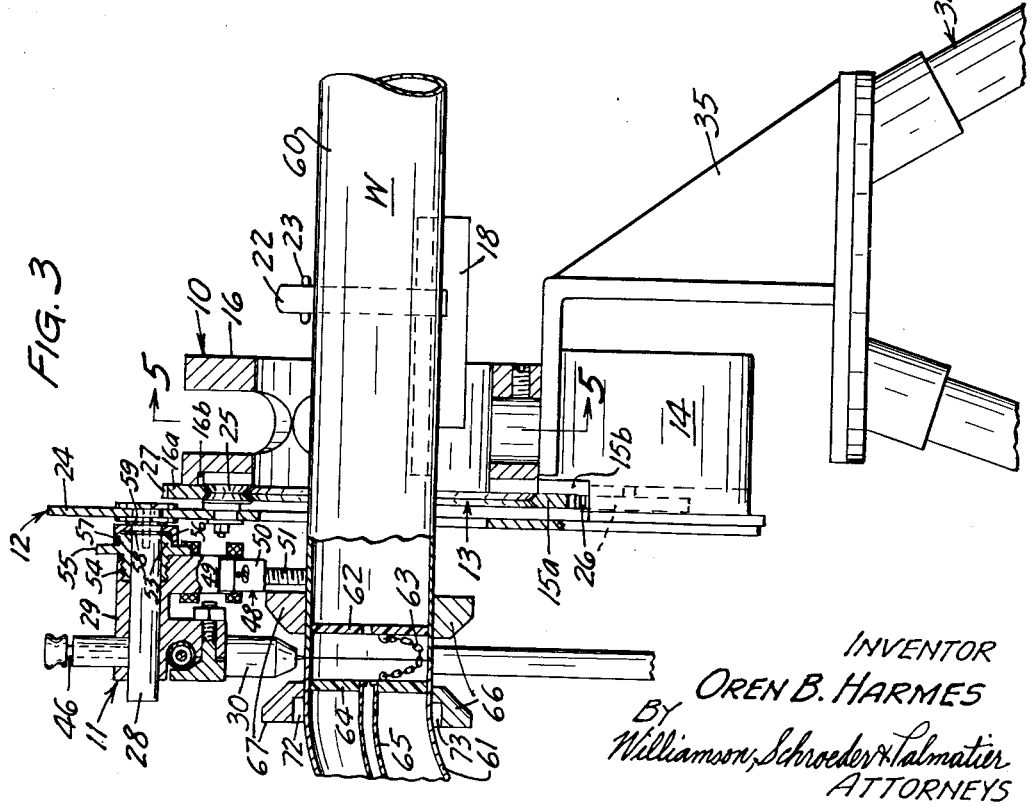
Fig. 3 is a fragmentary side elevational view of my butt-welding apparatus mounted in welding position with parts of the view broken away to more clearly show the construction thereof, the entire view being on an enlarged scale.

The engagement member or clamp 10 includes a lower section 15 and an upper section 16. These sections as best shown in Fig. 5 are arcuately formed and when secured together by studs 17 form a circular structure with an open center within which the work to be welded may lie. The lower section 15 is provided with a pair of removable collets 18 and 19 each of which is secured by studs 18a and 19a respectively. These collets 18 and 19 extend rearwardly from the lower section 15 as best shown in Figs. 2 and 3. Pivotally mounted on the collet 18 is an arcuately shaped hook member 20. Pivotally mounted on the collet 19 is a clamp member 21 which is comprised of an arcuate member similar in construction to the hook member 20 except that it has an over dead center lever member 22 pivotally mounted upon the upper end thereof in lieu of the hook of the element 20. The arm 22 has a loop 23 pivotally secured to its medial portion and adapted to engage the hook of the hook member 20 and secure a piece of work such as the pipe W in the manner best shown in Fig. 4. These collets 18 and 19 are removable so that similar collets of various size may be substituted therefor to thereby accommodate pieces of work of various diameters.

The lower section 15 of the engagement member 10 also includes an arcuately shaped element 15a which extends slightly inwardly of a recess 15b formed in the forward face of the element 15. A similar and cooperating arcuately shaped section 16a is carried by the upper section 16 and it too extends inwardly of the recess 16b which is formed in the forward face of the upper section 16. When the two sections 15 and 16 are secured together by the studs 17, the two arcuate sections 15a and 16a cooperatively form the way 13 which is a circular track for the carriage means 12.

The carriage 12 is comprised of an arcuately shaped plate 24 upon which is mounted a plurality of circumferentially spaced rollers 25. These rollers as best shown in Fig. 3 engage the way 13 and support the plate 24 upon which the torch holding member 11 is mounted so that the entire assembly comprised of the torch holding member 11, the plate 24 and the rollers 25 may be freely rotated along the way 13 and around the work W.

Fixedly mounted upon the plate 24 is the drive means 14. This drive means 14 is comprised of a spring motor having a drive gear 26 which engages and cooperates with a ring gear 27 formed on the outer surface of the elements 15a and 16a. The spring motor is provided with a governor (not shown) to cause the drive gear 26 to be driven at a uniform rate and thereby insure that the plate 24 will be driven at a uniform rate around the work W. The spring motor is of a conventional spring motor type well known in the art and it is therefore considered unnecessary to further describe its construction. It is sufficient to point out that this motor is entirely mechanical and hence is not subject to variations in electric potential as is the case with electric motors. In addition, no reduction gearing is required as would be the case if electric motors were to be utilized to drive the plate 24 around the work.

As best shown in Fig. 3, the torch holding member is mounted upon the plate 24 and extends forwardly therefrom. It includes a mounting shaft 28 which pivotally supports a head 29 to which the welding torch 30 is secured. The welding torch is preferably of the inert gas shielded arc type which utilizes a tungsten electrode and an inert gas such as argon or helium to maintain the arc and also to prevent oxidization of the electrode and the work. The electric current is carried by a conduit 31 to the torch 30 and this conduit is in turn connected to a control box 32 which is supported by a shank 33, the latter of which is in turn supported by a tripod 34 which in turn supports the entire welding apparatus by means of a mounting bracket 35 secured to the lower section 15 of the engagement member 10.

The control box 32 includes a voltmeter 36, an ammeter 37, a rheostat 38, an arc switch 39, a main switch 40, a gas control 41 for controlling the flow of gas to the torch, and a gas control 42 for controlling the flow of gas to the plug disposed within the work W as will be hereinafter described. A main gas line 43 extends from a gas source such as a tank (not shown) to the control box 32 and is connected with the controls 41 and 42. Main power lines 43 and 44 also lead into the control box 32 and are connected with the rheostat 38, the voltmeter 36 and the ammeter 37. The rheostat 38 is connected in such a way as to control the flow of current outwardly through the conduit 31 which is of the type wherein an electrical lead extends through the center thereof and gas may pass therearound through the conduit to be dispensed by the torch and immediately surround the tungsten electrode to thereby maintain the arc after it is formed and to preclude oxidization of the electrode and the work material during the welding operation. A second conduit 45 is connected to the control 42 and the source of gas introduced through the conduit 43 and is adapted to be connected to the plug disposed within the work as will be hereinafter described so as to introduce an inert gas such as argon along the weld line to preclude oxidization at the interior surface of the work and maintain a definite back pressure on the weld. Thus, by manipulation of the control 41 the flow of inert shielding gas outwardly through the conduit 31 adjacent the torch 30 can be controlled and the flow of gas through the conduit 45 to the gas plug within the work can be controlled by manipulation of the control 42. The amount of current passing through the torch 30 can be controlled by the welder by manipulation of the rheostat 38. The ammeter 37 will indicate the amperage being used.

The head 29 is also provided with a spring loaded catch member 46 which is constantly urged inwardly by the spring and rides upon the mounting shaft 28. The mounting shaft 28 is provided with a cooperating catch element indicated by the numeral 47 on Fig. 4 so that the two catch elements may cooperate to hold the torch 30 in raised position as shown in Fig. 1 when such is desirable, and particularly when the work is being secured to the entire assembly preparatory to welding the same. In this connection, it should be noted that tungsten rods are extremely brittle and quite expensive so it is important that extreme care be taken to avoid damage to the same.

Figure 4:
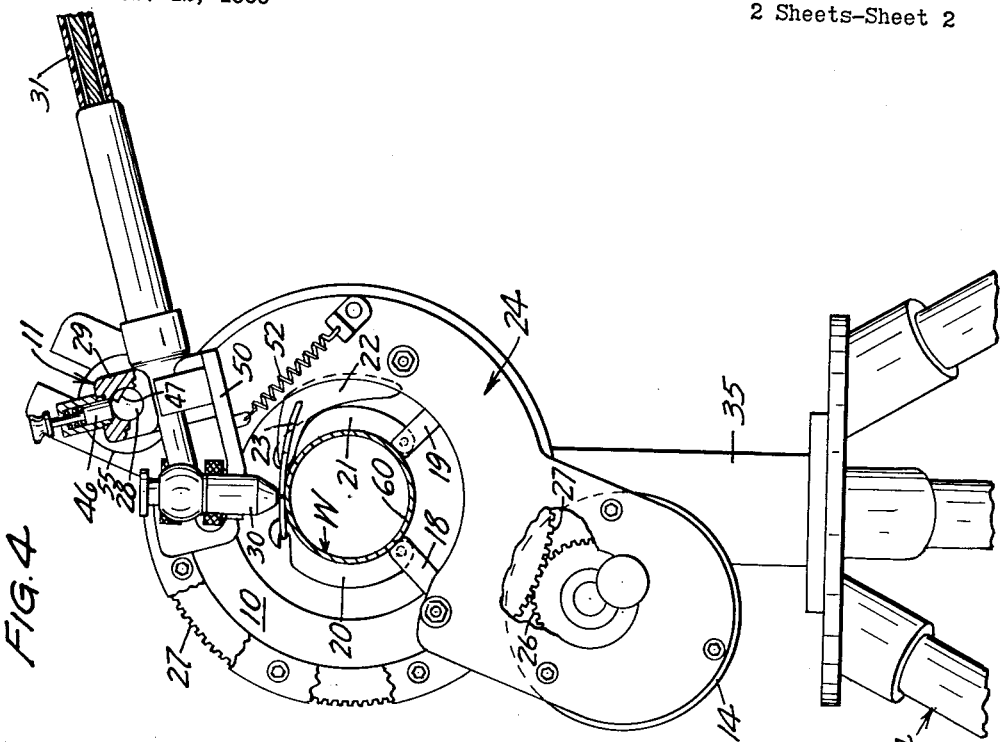
Fig. 4 is a fragmentary front elevational view of my butt-welding apparatus secured to a piece of work, with portions of the view being broken away to more clearly show the construction of the apparatus, the entire view being on an enlarged scale.

The head 29 also carries spacing means for positioning the torch and the tungsten electrode at the optimum distance from the weld line in order to maintain a definite arc voltage and also form the best possible weld during the welding operation. This spacing means is indicated by the numeral 48 and includes a depending lug 49 and a laterally extending arm 50 through which is threaded a threaded spacer element 51 adapted to be vertically adjusted relative to the arm 50 and to bear upon the work W so as to maintain the desired spacing between the end of the torch and the work itself. A spring 52 is connected to the arm 50 at one of its ends and to the plate 24 at its other end as best shown in Fig. 4 to constantly urge the spacer 51 against the work.

The lateral spacing means for the torch 30 is comprised of a sleeve 53 which at one of its ends is threaded into the head 29 as at 54. The sleeve 53 has a radially outwardly extending flange 55 to facilitate turning thereof. A cup-shaped element 56 is secured to the sleeve 53 by a pin or set screw 57 and this cup-shaped element is connected to the mounting shaft 28 in such a way as to permit rotation but to prevent movement longitudinally thereof by means of a pair of retaining washers 58 and 59 at opposite sides thereof. Thus, it can be readily seen that when the sleeve 53 is rotated by turning the flange 55 the head 29 will be caused to shift to the left or right as viewed in Fig. 3, depending upon the direction in which the sleeve 53 is turned. In this manner, the torch 30 can be shifted longitudinally of the work W.

Figure 7:
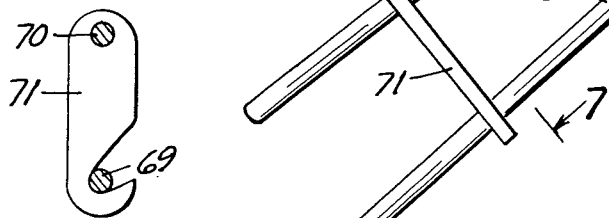
Fig. 7 is a sectional view taken along line 7—7 of Fig. 6.

In order to best illustrate the manner in which my apparatus may be utilized to butt-weld two pieces of work together, I have shown in Fig. 3 one piece of pipe 60 which is securely clamped within the engagement member 10 by means of the hook element 20, the clamp member 21, the lever member 22 and the loop or link 23. This is best shown in Fig. 4. A second piece of work 61 is shown in the form of an elbow so as to better illustrate the manner in which such a piece of work may be butt-welded to a pipe such as 60 even though the bend of the elbow is immediately adjacent the weld line. After my apparatus has been securely clamped to the pipe 60 as shown in Fig. 3, I then insert one section 62 of a gas back up plug which is connected by a chain or linkage 63 to the second section 64 of the back up plug. This section 64 is then inserted into the adjacent end of the piece of work 61 which is to be welded to the piece of work 60 with the lead tube 65 through which the inert shielding gas is to be introduced extending outwardly through the elbow 61 and connected to a source of inert shielding gas such as argon. I then apply a specially designed clamp which is shown in Figs. 3, 6 and 7 to hold the two pieces of work together as shown in Fig. 3 preparatory to and during the welding operation.

Figure 6:
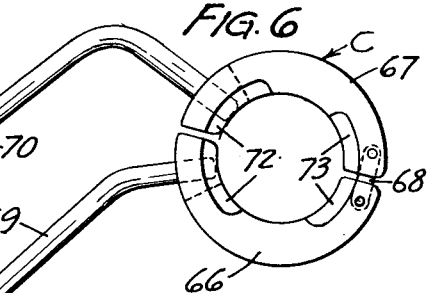
Fig. 6 is a side elevational view of my novel clamp which I utilize to secure the two pieces of work together preparatory to the welding operation.

My welding clamp which is indicated generally by the letter C is comprised of a pair of arcuate sections 66 and 67 pivotally connected at adjacent ends by a pair of links such as indicated by the numeral 68 in Fig. 6. Each of the sections 66 and 67 is provided with adjacent handles such as 69 and 70 which extend outwardly therefrom and which can be brought together and maintained under pressure by means of a locking link 71, the construction of which is best shown in Fig. 7. Each of the sections 66 and 67 has an open medial portion as best shown in Fig. 3. The open area extends between the links 68 and throughout the major portion of the sections 66 and 67 as best shown in Fig. 6 with only the end portions which support the handles 69 and 70 being continuous axially of the work. Thus, the clamp C has an open central portion extending circumferentially between the broken lines shown in Fig. 6, this area extending approximately 275° along the circumference of the clamp with only the portions immediately adjacent the handles 69 and 70 being continuous. The interior diameter of the clamp C is preferably slightly smaller than the external diameter of the pieces of work 60 and 61 so that when the handles 69 and 70 are clamped together as shown in Fig. 6, the pieces of work are held in tightly abutting relation as shown in Fig. 3. Each of the sections 66 and 67 are relieved at one of their sides and in opposing positions as best shown in Figs. 3 and 6 so as to permit an elbow such as 61 to be secured by the clamp without cocking the end portion of the elbow which is to be welded relative to the piece of work 60. These relieved areas have been indicated by the numerals 72 and 73.

After the back up shielding gas plug has been inserted as shown in Fig. 3 and the clamp C has been secured thereto to hold the two pieces of work 60 and 61 with their ends properly abutting as is also shown in Fig. 3, the welding operation can be commenced. I normally run a test weld each day to determine the optimum spacing of the torch 30 and also the optimum amperage. Thus, when the actual welding operation is commenced, the torch 30 is already disposed at optimum spacing and the operation can commence at once as soon as the torch 30 is lowered into position by releasing the catch element 46 to the position shown in Figs. 3 and 4. The flow of inert shielding gas such as argon or helium can be controlled by the welder by manipulation of the controls 41 and 42 so that the inert shielding gas will be introduced into the interior of the pieces of work through the tube 65 and will escape through the small central opening of the section 62 of the plug. It will be noted that this latter opening is slightly smaller than the opening through which the argon is introduced so that the welder is always assured that the weld line will be completely surrounded by inert shielding gas to preclude oxidization of the material at this line and maintain back pressure on the weld. At the same time, the inert shielding gas will be dispensed immediately surrounding the tungsten electrode so that the arc may be maintained and oxidization will be precluded at the exterior surface of the two pieces of work 60 and 61 along the weld line as well as of the tungsten itself. The drive means will be started after the arc is initiated and has been allowed to dwell for a few seconds. The torch will proceed at a uniform rate around the major portion of the two pieces of work 60 and 61 without interruption so that the entire circumference of the two pieces of work with the exception of the area immediately adjacent the handles 69 and 70 will be welded before it will be necessary to move the clamps. When this point is reached, the handles 69 and 70 are released and the clamp C is turned approximately a half turn so that the area previously covered by the continuous portion of the clamp C will now be disposed within the open framework of the clamp and the remainder of the welding operation may be completed, the drive and torch being disconnected only after the point at which the weld was started is reached. At this point the main switch 40 on the panel is shut off so that the arc is allowed to decay. This will eliminate crater formation. I have found that this machine provides a highly improved weld which is so smooth both exteriorly and interiorly that materials such as milk may be conveyed by pipes such as 60 and 61 after being so welded without additional polishing. This of course, effects a substantial saving in time and expense, for heretofore it has been necessary to polish such welds in order to prevent the collection of milk solids at the weld line and consequent growth of bacteria.

It will be noted that my apparatus can be utilized even though the pieces of work are fixedly secured to other structure. When this is the situation, the upper section 16 of the engagement member is removed by loosening the studs 17 and the piece of work is then clamped to the lower section 15 through use of the elements 20–23, inclusive. The carriage is then applied to the way 13 by bringing the rollers 25 to bear upon the portion of the way 13 which is supplied by the lower section 15 and the upper section 16 is then secured in place to complete the way and to hold the torch bearing member in proper position. The welding operation may then be completed in the manner as heretofore described.

It will be readily understood that if pieces of work of diameters different from those of the pieces of work 60 and 61 are to be welded, it is only necessary to substitute collets for the collets 18 and 19 having different dimensions in accordance with the diameter of the pieces of work to be butt-welded. Such collets of course, will also include correspondingly dimensioned elements 20, 21, 22 and 23.

It will be also readily understood that the spacing of the torch 30 can be varied by adjustment of the spacing member 51 and that the torch 30 may be shifted axially of the pieces of work 60 and 61 by adjustment of the sleeve 53 as heretofore described.

From the above it can be readily seen that I have provided novel and improved butt-welding apparatus which is readily adaptable for butt-welding of either fixed or movable pieces of work. It will also be seen that my apparatus enables the welder to perform the welding operation in a much more efficient and satisfactory manner and at a substantial saving in time and effort. Since the character of the weld depends much upon the spacing, the amperage, and the uniformity of speed at which the welding operation is performed, my welding apparatus perfects a highly superior weld. In fact, as indicated hereinbefore, a weld accomplished through the use of my welding apparatus is so smooth and superior to welds heretofore made possible that polishing of the interior surface of the weld which will come in contact with fluids such as milk are not required in the dairy industry. This advantage alone, makes my apparatus highly desirable and of optimum value for use in welding conveying lines such as milk conduits.

It will, of course, be understood that various changes may be made in the form, details, arrangement and proportions of the parts without departing from the scope of the invention.

What is claimed is:

1. A butt-welding device for butt-welding a piece of work comprising, an engagement member for rigidly engaging the work to be butt-welded to secure the same to the work in fixed relation thereto, a welding-torch holding member, a way carried by one of said members, carriage means carried by the other of said members and cooperatively engaging said way and movably supporting said torch holding member on said engagement member in cooperation with said way, and drive means fixedly connected with said carriage means and extending between said members in driving relation and driving said carriage means along said way to thereby move said torch holding member relative to said engagement member and any work to which the latter may be secured.

2. The structure defined in claim 1 wherein said way is annular and is arranged relative to said engagement member to extend around the work when said engagement member is secured thereto.

3. The structure defined in claim 1 wherein said way is circular and is arranged relative to said engagement member to extend substantially coaxially of the work when said engagement member is secured thereto.

4. The structure defined in claim 1 wherein said way is carried by said engagement member and said carriage means is carried by said torch holding member.

5. The structure defined in claim 1 wherein said driving means is comprised of a spring motor equipped with a governor to insure a constant speed of movement of said torch holding member.

6. The structure defined in claim 1 wherein said way is arcuate and said torch holding member is pivotable about an axis parallel to the axis of said arcuate way between operative and inoperative positions for the torch to be held by said member, and releasable locking means for locking said member in inoperative position.

7. The structure defined in claim 1 wherein said way is arcuate and said torch holding member is movably mounted on said carriage means for movement relative thereto axially of said way, and means for adjustably moving said torch holding member axially of said way.

8. The structure defined in claim 1, and portable support means connected to said engagement member and supporting the same.

9. The structure defined in claim 1, portable support means connected to said engagement member and supporting the same, an electrical welding torch carried by said torch holding member, and electric current control means mounted on said support means and movable therewith and connected in electric current transmitting relation with said welding torch whereby the user of the latter may readily control the amperage to said torch.

10. The structure defined in claim 1 wherein said way is annular and said torch holding member is pivotable about an axis parallel to the axis of said annular way, and adjustable spacer mechanism connected to said torch holding member and being adjustable to vary the spacing of the torch relative to work engaged by said engagement member.

11. The structure defined in claim 1 wherein said way is arcuately defined, a welding torch supported by said torch holding member, arcuately shaped clamping means constructed and arranged to clamp two pieces of work together with their adjacent ends in abutting relation opposite said welding torch, said clamping means having an open central portion extending circumferentially thereof whereby said torch may weld the abutting ends of two such pieces of work while moving with said carriage means along said way while said clamping means is clamping the two pieces of work together.

12. A butt-welding device for butt-welding a piece of work comprising, a frame member, means for rigidly securing said frame member to the work to be butt-welded, a welding-torch holding member, a way carried by one of said members, carriage means carried by the other of said members and cooperatively engaging and moving along said way and movably supporting said torch holding member on said frame member in cooperation with said way, and drive means fixedly connected with said carriage means and extending between said members in driving relation and driving said carriage means along said way to thereby move said torch holding member relative to said frame member and any work to which the latter may be secured by said securing means.

13. The structure defined in claim 12 wherein said way is carried by said frame member and said carriage means is carried by said torch holding member.

14. The structure defined in claim 12 wherein said way is annular and substantially coaxial with and extends around the longitudinal center of the area within which the work will lie when said securing means is secured thereto.

References Cited in the file of this patent

UNITED STATES PATENTS

| 2,013,630 | Goldsborough | Sept. 3, 1935 |
| 2,721,248 | Kirkpatrick | Oct. 18, 1955 |
| 2,795,689 | McNutt | June 11, 1957 |